Patented Dec. 17, 1940

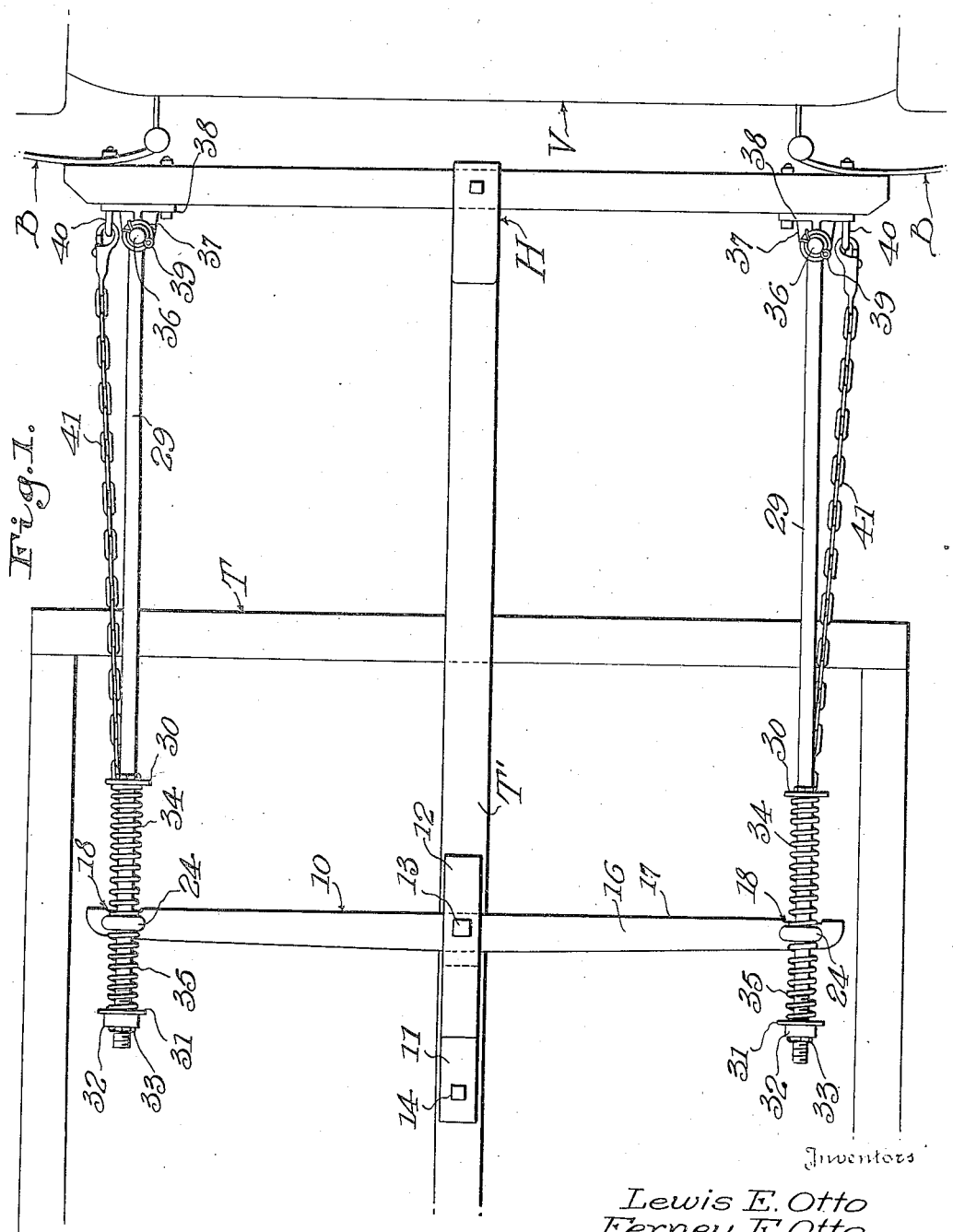

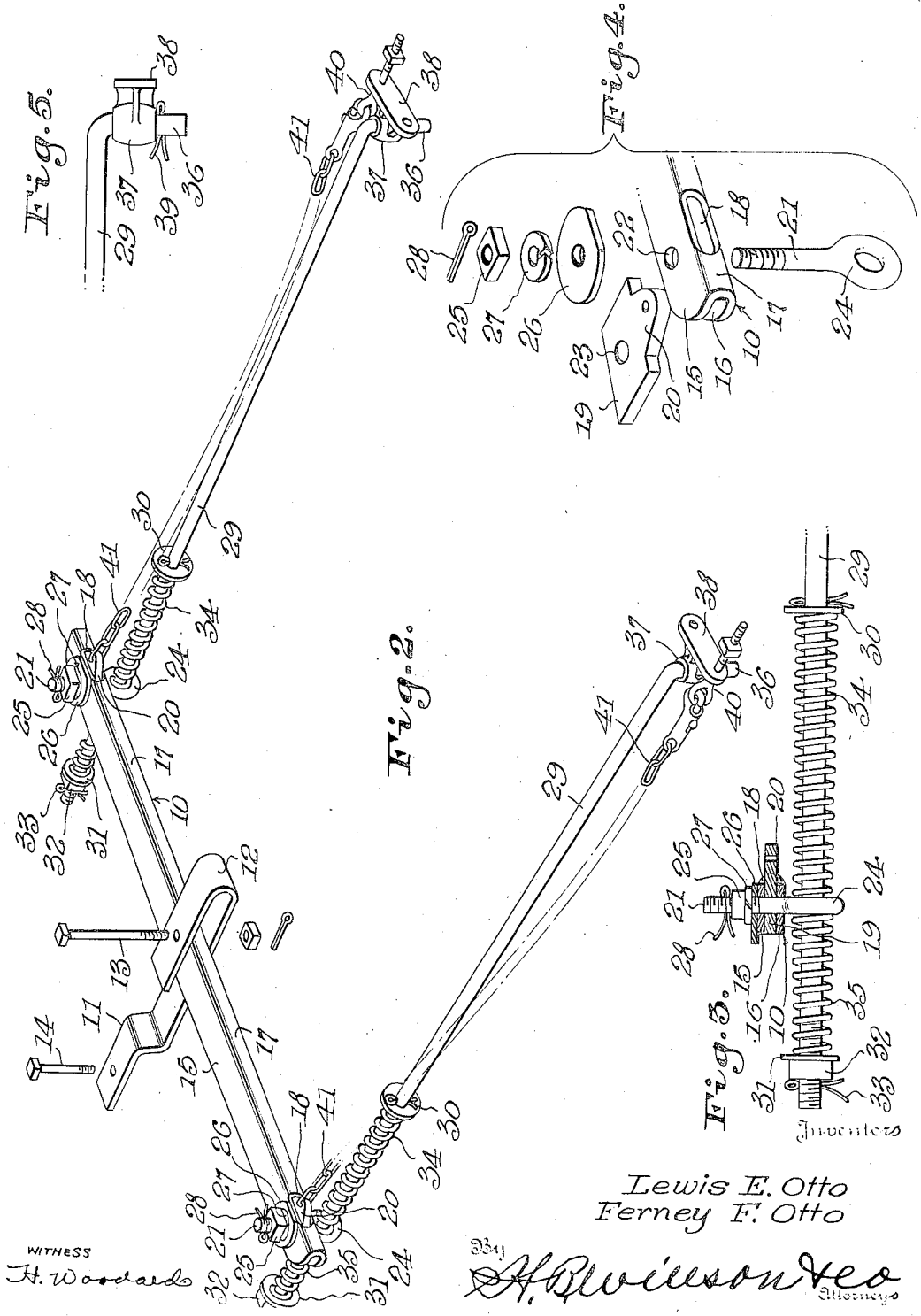

2,225,130

UNITED STATES PATENT OFFICE 2,225,130

TRAILER SAFETY HITCH

Lewis E. Otto and Ferney F. Otto, Logansport, Ind.

Application October 28, 1939, Serial No. 301,838

3 Claims. (Cl. 280—33.9)

The invention aims to provide a new and improved safety hitch for use in connecting automobiles and trailers, the device being used in addition to the regular hitch to hold the trailer connected with the machine and on the road in case of injury to the usual hitch or loss of a coupling pin or the like.

The object of the invention is to provide an exceptionally simple and inexpensive safety hitch, one which may be easily applied and adjusted, and one which will be safe and durable.

With the foregoing in view, the invention resides in the novel subject matter hereinafter described and claimed, description being accomplished by reference to the accompanying drawings.

Figure 1 is a bottom plan showing the hitch operatively connected with a trailer and a leading vehicle.

Figure 2 is a perspective view of the hitch detached.

Figure 3 is a fragmentary side elevation partly in section.

Figure 4 is a disassembled perspective of a number of the parts shown in Fig. 3.

Figure 5 is a detail side elevation illustrating one of the connections between the hitch and the leading vehicle.

In the drawings above briefly described, a preferred construction has been illustrated and while such construction will be specifically explained, it is to be understood that variations may be made within the scope of the invention as claimed.

A lever 10 is provided to extend transversely of a trailer T, and I provide means for fulcruming said lever on a vertical axis to the trailer. In the present disclosure, a clevis bar 11 is provided at its front end with a loop 12 through which the lever 10 passes, a bolt 13 being passed through openings in said loop and lever and serving to secure the front portion of the clevis bar 11 to the trailer, preferably against the lower side of the tongue T'. The rear end of the bar 11 is secured by another bolt 14. While the nuts on both bolts 13 and 14 are suitably locked, if said bolt 13 should become lost or broken, the loop 12 will hold the lever 10 connected with the trailer.

I preferably form the lever 10 from a single piece of metal bent to provide it with upper and lower flanges 15 and 16 and a flange-connecting portion 17 all extending throughout the length of the lever, said portion 17 integrally connecting the front edges of the flanges 15 and 16 with each other. Near its ends, the portion 17 is formed with two openings 18 through which lugs 20 extend forwardly, said lugs being integral with two plates 19 which are snugly received between the upper and lower flanges 15 and 16. Vertical eye-bolts 21 pass through alined openings 22 and 23 in the flanges and plates, the eyes 24 of said eye-bolts being preferably at the lower side of the lever 10. Between the nuts 25 of these eye-bolts and the upper flange 15, are preferably interposed a large washer 26 and a lock washer 27, and the nuts 25 are further safeguarded by passing cotter pins 28 through the bolts 21. Two pull rods 29 have their rear portions passed slidably through the eyes 24, said pull rods having suitable front abutments 30 in advance of said eyes 24, and rear abutments 31 behind said eyes, the abutments 31 being preferably adjustable by means of nuts 32 which are held against complete removal from the rods by cotter pins or the like 33. Front compression springs 34 surround the rods 29 between the abutments 30 and the eyes 24, and rear compression springs 35 surround said rods between said eyes 24 and the rear abutments 31.

The front ends of the pull rods 29 are bent downwardly at 36 in the present disclosure and extended through vertical bearings 37 having suitable attaching plates 38 by means of which they are secured to the bumper B of the leading vehicle V. Cotter pins 39 pass through the downturned ends of the rods 29, under the bearings 37.

In bolting the attaching plates 38 to the bumper B, I preferably use two eye-bolts 40 and two ordinary bolts. The eye-bolts 40 serve to secure the front ends of two normally slack safety chains 41 to the leading vehicle V, the rear ends of said safety chains 41 being secured to the lugs 20 of the plates 19. While the chains 41 normally take no load, they stand in readiness to connect either end of the lever 10 with the leading vehicle, should one of the rods 29 break, should one of the eye-bolts 21 break, or become lost, or should one of the nuts 32 work loose and become detached from the rod. Even if either eye-bolt 21 becomes entirely removed, nothing serious can happen, for the adjacent chain 41 will come into play, this chain being connected with the lever 10 by means of the lug 20 and plate 19, even when the eye-bolt 21 is not in place.

In straight-ahead operation, the rods 29 like the tongue T extend longitudinally of the roadway and jointly receive the pull of the leading vehicle on the trailer and jointly receive the braking strain. There is usually more or less lost motion in the customary hitch H connecting the tongue T with the leading vehicle V, and the yieldable connections between the pull rods 29 and the lever 10 prevent the jerking which usually occurs when starting and stopping. Moreover, these yieldable connections permit the necessary relative movements of trailer and machine to permit the "surge brakes" of the trailer to function, if such brakes be provided. When turning to the right or left, the pull rods 29 and the lever 10 swing about their vertical pivots, cause no binding and continue to perform their functions. In case the hitch H should become inoperative for any reason, the pull rods 29 will hold the trailer in the road and under control. Similarly, should either of the rods 29 become inoperative for any reason, the safety chains 41 will function.

Excellent results have been obtained from the details shown and described and they are, therefore, preferably followed. However, attention is again invited to the possibility of making variations within the scope of the invention as claimed, and such variations obviously include changes in materials, sizes, etc.

What is claimed is:

1. A trailer safety hitch comprising a lever to extend transversely of a trailer, fulcrum means for connecting the center of said lever with the trailer on a vertical axis, two eyes at the ends of said lever respectively, means pivoting said eyes to said lever ends on vertical axes, two pull rods having their rear end portions passed slidably through said eyes respectively, front abutments on said rods in advance of said eyes, front compression springs on said rods between said front abutments and said eyes, rear abutments on said rods behind said eyes, rear compression springs on said rods between said rear abutments and said eyes, and means for pivotally connecting the front ends of said rods with a leading vehicle.

2. A structure as specified in claim 1; together with two normally slack safety chains extending longitudinally of said rods and secured at their rear ends to the ends of said lever, and means for securing the front ends of said chains to the leading vehicle.

3. A trailer safety hitch comprising a lever to extend transversely of a trailer, said lever having upper and lower flanges extending throughout its length and a flange-connecting portion connecting the front edges of said flanges with each other, said flange-connecting portion being provided with two openings near its ends respectively, two plates between the end portions of said upper and lower flanges and having lugs extending forwardly through said openings, two eye-bolts passing vertically through said end portions of said flanges and through said plates, two pull rods having their rear portions passed slidably through the eyes of said eye-bolts, spring-and-abutment-means establishing yieldable connections between said eyes and said rods, two normally slack safety chains extending longitudinally of said rods respectively and secured at their rear ends to the aforesaid lugs of said plates, means for pivoting the front ends of said rods to a leading vehicle, and means for securing the front ends of said safety chains to the leading vehicle.

LEWIS E. OTTO.
FERNEY F. OTTO.